(12) United States Patent
Steele et al.

(10) Patent No.: US 9,845,783 B2
(45) Date of Patent: Dec. 19, 2017

(54) JUMPSTARTING AN INTERNAL COMBUSTION ENGINE

(71) Applicant: GM GLOBAL TECHNOLOGY OPERATIONS LLC, Detroit, MI (US)

(72) Inventors: Russell K. Steele, Clinton Township, MI (US); James F Crawford, Macomb, MI (US); Stephen D Gurski, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 257 days.

(21) Appl. No.: 14/808,474

(22) Filed: Jul. 24, 2015

(65) Prior Publication Data

US 2017/0022955 A1    Jan. 26, 2017

(51) Int. Cl.
  *F02N 11/08*  (2006.01)
  *F02N 11/14*  (2006.01)
  (Continued)

(52) U.S. Cl.
  CPC ........ *F02N 11/0866* (2013.01); *F02N 11/087* (2013.01); *F02N 11/14* (2013.01);
  (Continued)

(58) Field of Classification Search
  CPC .. F02N 11/08; F02N 11/0803; F02N 11/0862; F02N 11/0866; F02N 11/14; F02N 2011/0885; F02N 2011/0896; F02N 2019/002; F02N 99/002; F02N 2200/061; F02N 2200/062; F02N 2200/063; H02J 2001/006
  See application file for complete search history.

(56) References Cited

U.S. PATENT DOCUMENTS 4,541,390 A * 9/1985 Steinbrenner ......... F02D 41/064
                                                  123/478
7,795,838 B2 * 9/2010 Singarajan .......... B60L 11/1868
                                                  320/104

(Continued)

FOREIGN PATENT DOCUMENTS

CN    WO 2014166351 A1 * 10/2014 ............... H02J 1/00

*Primary Examiner* — Erick Solis
*Assistant Examiner* — Anthony L Bacon
(74) *Attorney, Agent, or Firm* — Quinn IP Law

(57) ABSTRACT

A multi-mode powertrain system including an internal combustion engine, a high-voltage electric machine and a high-voltage electric power system is described. A method for controlling the multi-mode powertrain system includes, in response to an operator initiating a jumpstart, electrically connecting the high-voltage electric power system to a remote electric power source and energizing contactors between the high-voltage electric power system and the remote electric power source. Electric power flow through an auxiliary power module electrically connected to the high-voltage electric power system that supplies electric power to an accessory device is minimized. Engine starting parameters are modified, and the internal combustion engine is started by controlling, via a controller, the high-voltage electric machine to spin the internal combustion engine, and controlling operation of the internal combustion engine based upon the modified engine starting parameters to effect starting.

19 Claims, 3 Drawing Sheets

(51) Int. Cl.
*H02J 3/00* (2006.01)
*H02J 7/00* (2006.01)
*H02J 7/34* (2006.01)

(52) U.S. Cl.
CPC ............... *H02J 3/00* (2013.01); *H02J 7/00* (2013.01); *F02N 2011/0896* (2013.01); *F02N 2200/063* (2013.01); *H02J 7/34* (2013.01)

(56) References Cited

U.S. PATENT DOCUMENTS

| | | | |
|---|---|---|---|
| 8,395,350 B2 * | 3/2013 | Sloan | B60K 6/365 320/105 |
| 2004/0041403 A1 * | 3/2004 | Fattic | F02N 11/0866 290/38 E |
| 2007/0113814 A1 * | 5/2007 | Tamai | B60L 11/1868 123/179.3 |
| 2013/0314041 A1 * | 11/2013 | Proebstle | F02N 11/0866 320/109 |
| 2015/0165993 A1 * | 6/2015 | Schaeffer | B60R 16/033 307/10.6 |
| 2015/0300307 A1 * | 10/2015 | Setterberg | F02N 11/087 701/113 |
| 2016/0208762 A1 * | 7/2016 | Morita | F02N 11/0862 |

* cited by examiner

JUMPSTARTING AN INTERNAL COMBUSTION ENGINE

TECHNICAL FIELD

This disclosure relates to multi-mode powertrain systems, and control routines related operation of multi-mode powertrain systems.

BACKGROUND

Vehicles may employ powertrain systems that generate propulsion power from an internal combustion engine (engine) in conjunction with a non-combustion motor such as one or multiple high-voltage electric motor/generators. The high-voltage electric motor/generator(s) draw electric power from an on-vehicle high-voltage electric energy storage device, e.g., a high-voltage battery, via a high-voltage electric power circuit. The high-voltage battery may be charged during vehicle operation, and/or may be charged using electric power sourced from an off-vehicle electric source.

Operating circumstances such as vehicle parking for an extended period of time may result in discharging of the high-voltage battery to a charge state that is insufficient for starting the engine. Similarly, a system fault may result in discharging of the high-voltage battery to a charge state that is insufficient for starting the engine. Starting the engine is desirable.

SUMMARY

A multi-mode powertrain system including an internal combustion engine, a high-voltage electric machine and a high-voltage electric power system is described. A method for controlling the multi-mode powertrain system includes, in response to an operator initiating a jumpstart, electrically connecting the high-voltage electric power system to a remote electric power source and energizing contactors between the high-voltage electric power system and the remote electric power source. Electric power flow through an auxiliary power module electrically connected to the high-voltage electric power system that supplies electric power to an accessory device is minimized. Engine starting parameters are modified, and the internal combustion engine is started by controlling, via a controller, the high-voltage electric machine to spin the internal combustion engine, and controlling operation of the internal combustion engine based upon the modified engine starting parameters to effect starting.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
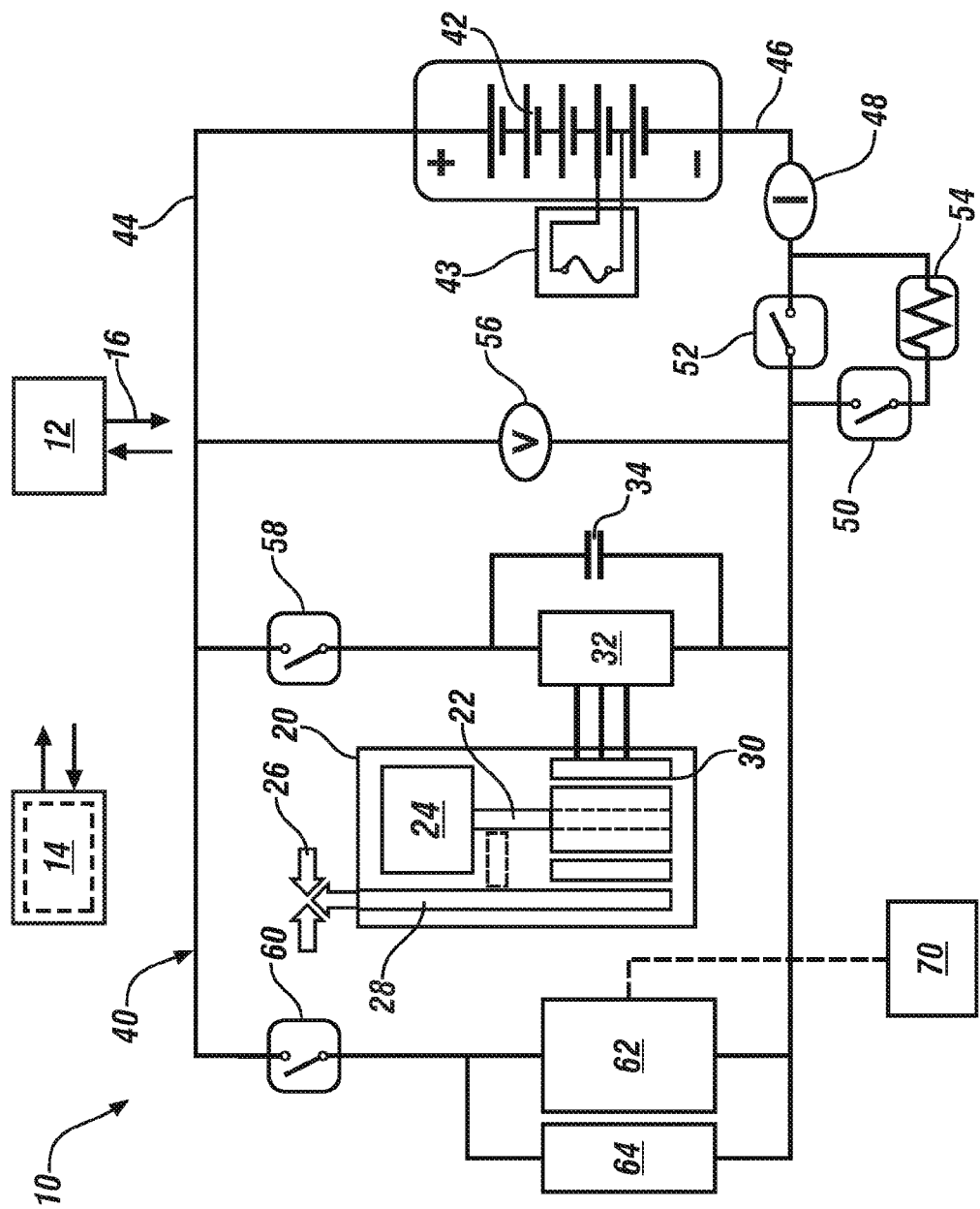
FIGS. 1 and 2 schematically illustrate embodiments of a vehicle including a powertrain system that includes an internal combustion engine, an electric machine and a geartrain that mechanically couples to a vehicle driveline to supply propulsion power to one or a plurality of vehicle wheels and a high-voltage electric power system, in accordance with the disclosure.

Referring now to the drawings, wherein the depictions are for the purpose of illustrating certain exemplary embodiments only and not for the purpose of limiting the same, FIG. 1 schematically illustrates a vehicle 10 including a powertrain system 20 and a high-voltage electric power system 40, the operation of which is controlled by a controller 12. The powertrain system 20 preferably includes an internal combustion engine (engine) 24 mechanically coupled an electric machine 30 and a geartrain 28 that mechanically couples to a vehicle driveline 26 to supply propulsion power to one or a plurality of vehicle wheels. Like numerals indicate like or corresponding parts throughout the several views. The vehicle 10 operates in response to operator commands and directions, including initiating and ending vehicle and powertrain operation in response to operator commands through a user interface 14 that may include an ignition switch or other suitable device.

The engine 24 may be any suitable internal combustion engine that converts hydrocarbon-based or other fuel to mechanical power through combustion processes. The engine 24 mechanically rotatably couples to the electric machine 30 using a rotatable member 22 of the geartrain 28 or another suitable mechanical coupling. The mechanical coupling of the engine 24 and the electric machine 30 is such that the electric machine 30 may spin the engine 24 as part of an engine starting procedure. As such, the engine 24 described herein is preferably not configured with a low-voltage (e.g., 12 Vdc) electric starter system.

The electric machine 30 may be any electric machine including a rotor and stator that converts high-voltage electric power to mechanical power and preferably converts mechanical power to electric energy that may be stored in a high-voltage energy storage device (high-voltage battery) 42, and in one embodiment is a high-voltage multi-phase motor/generator device that electrically connects to a traction power inverter module (TPIM) 32. The powertrain system 20 may employ a second or more electric machines for vehicle propulsion and other functions. The geartrain 28 may include any suitable mechanical power transfer mechanisms, such as planetary gears, helical gears and other gearsets, rotating shafts, clutches, brakes and other devices without limitation. The rotatable member 22 may include any suitable form such as a rotating shaft, a meshed gear arrangement, or a belt-drive arrangement, by way of non-limiting examples. Alternatively, the rotatable member 22 may include mechanical coupling to the engine 24 via a ring gear, carrier gear or sun gear of a planetary gearset of one embodiment of the geartrain 28 of the powertrain system 20. Other details of embodiments of mechanical interconnections between the engine 24, the electric machine 30 and the gear train 28 are known and not described in detail.

The high-voltage electric power system 40 includes the high-voltage battery 42 that supplies electric power via a high-voltage bus to electric power components. The high-voltage bus includes a positive side (HV+) 44 and a negative side (HV−) 46, with electric power monitored by a current sensor 48 and a voltage sensor 56. The electric power components preferably include the TPIM 32, an auxiliary power module (APM) 64 and an AC charger 62. The high-voltage battery 42 may be any suitable high-voltage energy storage device, e.g., a multi-cell lithium ion device, an ultracapacitor, or another device without limitation, and preferably includes a high-voltage electrical interrupt link 43. A negative bus contactor switch 52 connects HV− 46 to the high-voltage battery 42, and a pre-charge contactor switch 50 with a resistor 54 are arranged in parallel therewith.

The TPIM 32 electrically connects between HV+ 44 and HV− 46 with a propulsion capacitor 34 in an electrical parallel arrangement, with a positive contactor switch 58 arranged in electrical series with the TPIM 32 between HV+ 44 and HV− 46. The TPIM 32 is configured with suitable control circuits including power transistors, e.g., IGBTs for transforming high-voltage DC electric power to high-voltage AC electric power and transforming high-voltage AC electric power to high-voltage DC electric power. In one embodiment, the TPIM 32 employs pulsewidth-modulating (PWM) control to convert stored DC electric power originating in the high-voltage battery 42 to AC electric power to drive the electric machine 30 to generate torque. Similarly, the TPIM 32 converts mechanical power transferred to the electric machine 30 to DC electric power to generate electric energy that is storable in the high-voltage battery 42, including as part of a regenerative power control strategy. The TPIM 32 is configured to receive motor control commands and control inverter states to provide the motor drive and regenerative braking functionality. The propulsion capacitor 34 is a known capacitance device that is preferably configured with low-impedance and high capacitance. The APM 64 and the AC charger 62 are preferably arranged in parallel between HV+ 44 and HV− 46 with an APM contactor switch 60 arranged in electrical series.

The APM 64 preferably includes a DC/DC electric power converter that electrically connects to a low-voltage bus and a low-voltage battery in one embodiment. The APM 64 provides low-voltage electric power to low-voltage systems on the vehicle, including, e.g., electric windows, HVAC fans, seats, and other accessory devices.

The AC charger 62 is an on-vehicle battery charger that is electrically connectable via a charging cable to a remote, off-vehicle AC electric power source (remote AC power source) 70 for charging of the high-voltage battery 42 while the vehicle 10 is stationary. Preferably, the remote AC power source 70 supplies high-voltage AC electric power, e.g., at 240 VAC to the AC charger 62, which filters and otherwise conditions the high-voltage AC electric power to make it suitable for charging the high-voltage battery 42.

The user interface 14 includes a controller or related device that signally connects to a plurality of human/machine interface devices through which an operator commands operation of the vehicle 10. The user interface 14 may include, but is not limited to, elements on a vehicle instrument cluster or center console that may include a touch screen, a physical keyboard, a mouse, a microphone, and/or a speaker. In one embodiment, the touch screen may be responsive to tactile inputs from an operator, including but not limited to pointing, tapping, dragging, two-finger pinching, two-finger expanding, etc. The user interface 14 may include an ignition key or a vehicle start button for initiating and ending vehicle and powertrain operation. Other on-vehicle user interface devices may include, e.g., an accelerator pedal, a brake pedal, a transmission range selector (PRNDL) and an ignition switch to enable an operator to crank and start the engine 24.

The controller 12 signally connects to the operator interface 14. The controller 12 preferably includes a plurality of discrete devices that are co-located with the individual elements of the powertrain system 20 to effect operational control of the individual elements of the powertrain system 20 in response to operator commands and powertrain demands. The controller 12 may also include a control device that provides hierarchical control of other control devices. The controller 12 communicatively connects to each of the high-voltage battery 42, the APM 64, the AC charger 62, the TPIM 32 either directly or via a communications bus 16 to monitor and control operation thereof. the controller 12 communicatively connects to the The controller 12 commands operation of the powertrain system 20, including selecting and commanding operation in one of a plurality of operating modes to generate and transfer torque between the torque generative devices, e.g., the engine 24 and the electric machine 30 and the driveline 26. The operating modes preferably include one or more electric-vehicle (EV) modes wherein the engine 24 is in the OFF state and the electric machine 30 generates propulsion torque. The operating modes preferably also include an electrically-variable mode wherein the engine 24 and the first electric machines 30 generate propulsion torque. The operating modes may also include an extended-range EV mode wherein the engine 24 is in the ON state and generating electric power through the electric machine 24 and a second electric machine is generating propulsion torque. The extended-range EV mode, the EV mode and the electrically-variable mode each have an associated battery charging mode that may be either a charge-sustaining mode or a charge-depleting mode.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be periodically executed at regular intervals during ongoing operation. Alternatively, routines may be executed in response to occurrence of a triggering event. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 2:
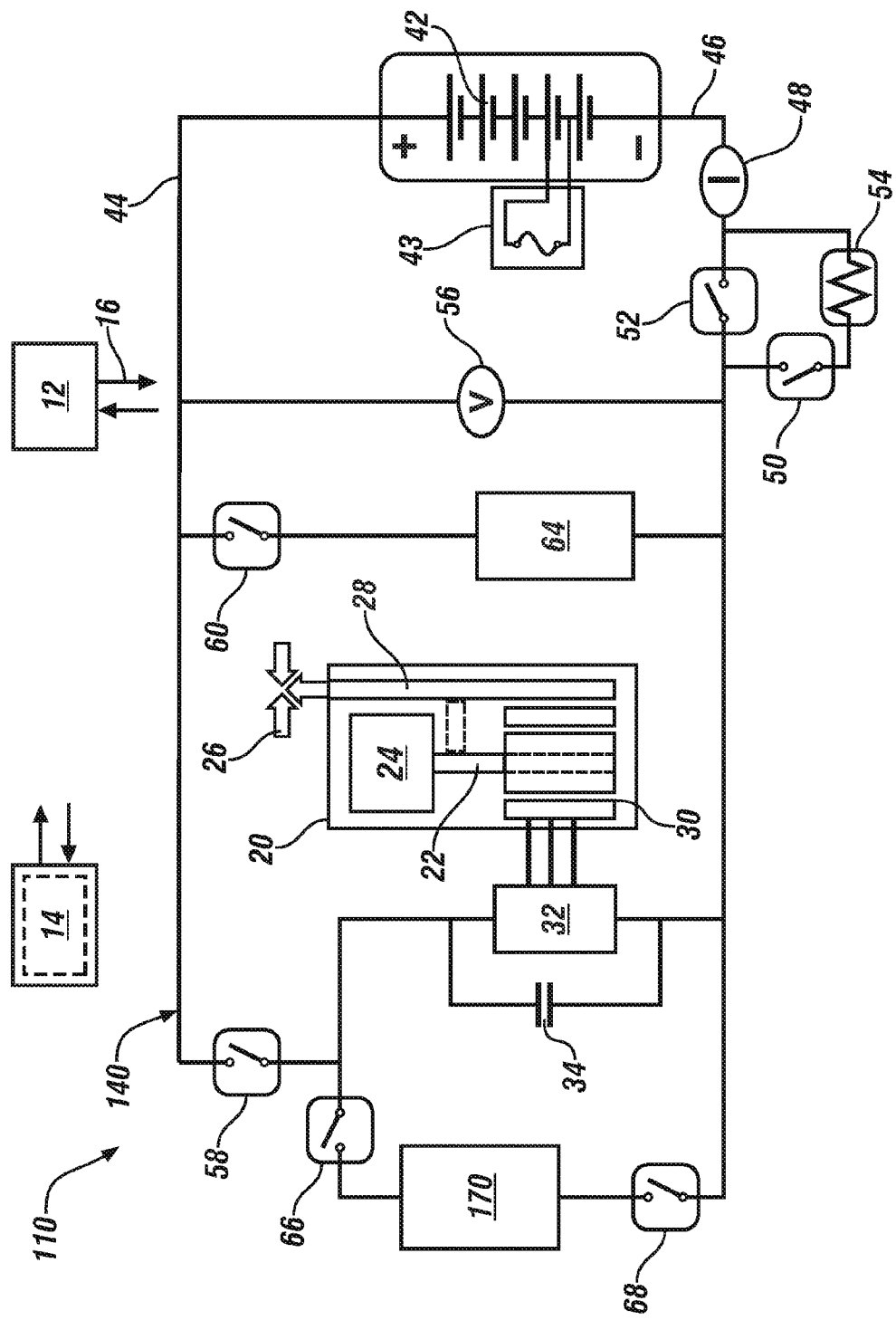

FIG. 2 schematically illustrates a second embodiment of a vehicle 110 including the powertrain system 20 and a high-voltage electric power system 140. The vehicle 110 is analogous to the vehicle 10 described with reference to FIG. 1 in many particulars, including the powertrain system 20 preferably including the engine 24, electric machine 30 and geartrain 28 that mechanically couples to the vehicle driveline 26 to supply propulsion power to one or a plurality of vehicle wheels. The high-voltage electric power system 140 includes the high-voltage battery 42 that supplies electric power via the high-voltage bus to electric power components. The electric power components preferably include the TPIM 32 and the APM 64.

Positive and negative ends of the TPIM 32 are configured to electrically connect to an off-vehicle DC electric power source (remote DC power source) 170 via contactors 66 and 68. Preferably, the remote DC power source 170 supplies DC electric power to the high-voltage bus to power the TPIM 32 and electrically charge the high-voltage battery 42 when the vehicle 110 is stationary.

Figure 3:
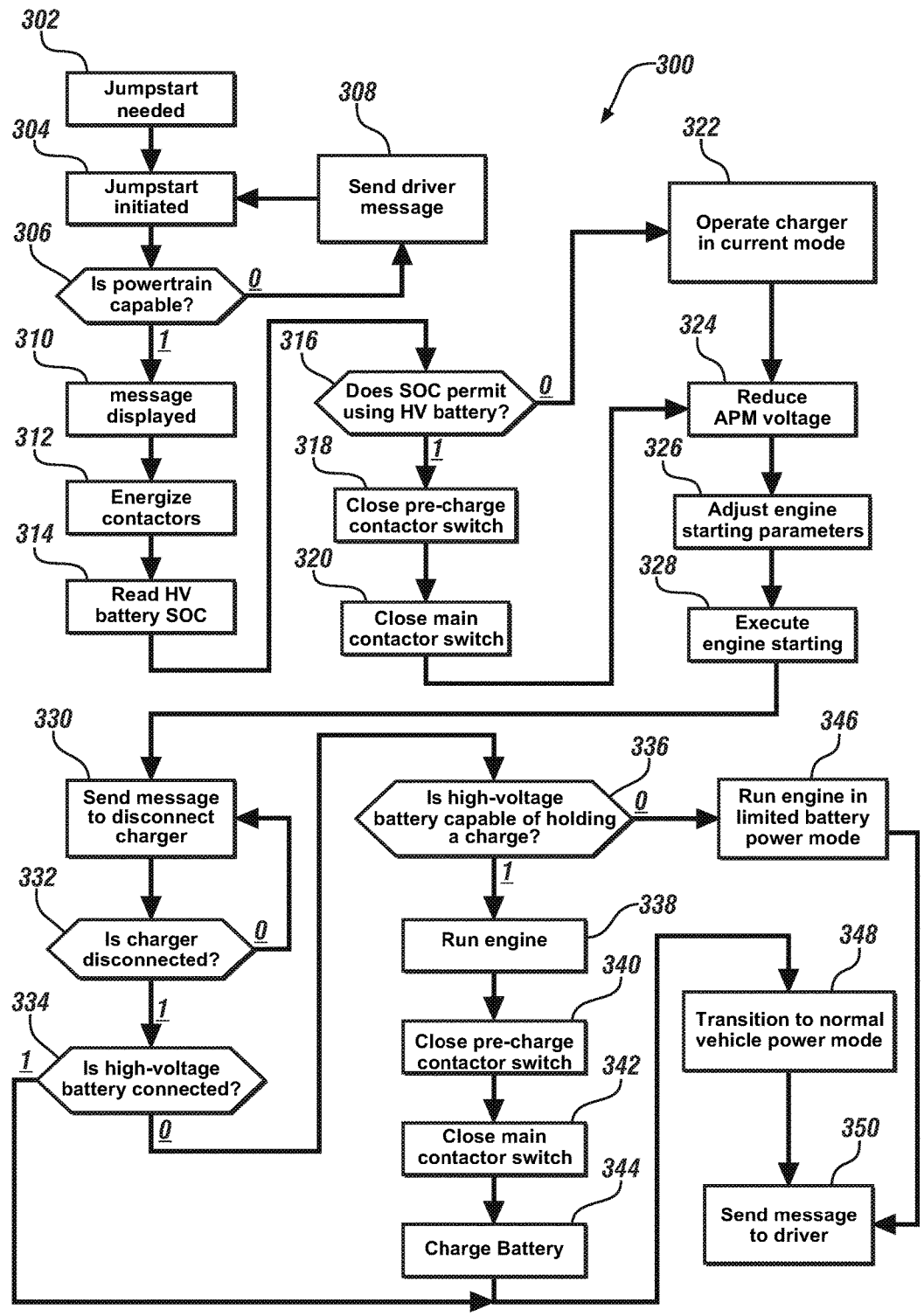
FIG. 3 schematically shows a jumpstart control routine for jumpstarting an embodiment of the powertrain system described with reference to FIGS. 1 and 2 using electric power originating from a remote off-vehicle electric power source, in accordance with the disclosure.

FIG. 3 schematically shows a jumpstart control routine (routine) 300 for jumpstarting an embodiment of the powertrain system 20 using electric power originating from a remote off-vehicle AC electric power source, e.g., the remote AC power source 70 described with reference to FIG. 1, or using electric power originating from a remote off-vehicle DC electric power source, e.g., the remote DC power source 170 described with reference to FIG. 2. The concepts described herein may apply to embodiments of powertrain systems that include internal combustion engines that receive starting torque from electric machines that employ high-voltage electric power from a high-voltage electric power system including a high-voltage battery.

Overall, the routine 300 may be initiated by a vehicle operator through menu selection on the user interface 14, or by a sequence of operator actions with message feedback. Such action may include, by way of example, connecting to the off-vehicle charger, pressing and holding a vehicle start button for 10 seconds, or until a message directs the operator to hold the vehicle start button again within 5 seconds to initiate an engine starting event. Engine parameters may be modified to reduce the power required to start the engine 24, such as selecting a reduced engine speed at which fueling and spark is initiated. Voltage of the APM 64 is preferably minimized to reduce its electrical load. After the engine 24 is started, the charger is depowered and a message is delivered to the operator indicating that the remote off-vehicle charger can be disconnected from the vehicle 10, 110. The external power source may be either 240 AC or high-voltage DC when the vehicle 110 is equipped with DC charging capability. The electric power may be delivered through either a stationary source, e.g., a charging station) or a mobile source, e.g., from a tow truck or another service vehicle. Once the engine 24 is started, if the high-voltage battery 42 can accept a charge, the engine 24 runs to maintain a constant HV bus at the same voltage as the high-voltage battery 42, and the battery 42 is connected to the HV bus. Otherwise, after the vehicle 10, 110 has started and the charger has been disconnected, the vehicle may be driven in a limited battery power mode if the HV battery 42 is not available or in a charge sustaining mode if the high-voltage battery 42 is able to be connected and charged.

If the charge state of the high-voltage battery 42 is too low to start the engine 24 but still within a chargeable range, the high-voltage battery 42 may be activated after some minutes to bring the battery voltage up to a level that would support engine start with the high-voltage battery and an external charger.

This method stabilizes the high voltage bus and changes the engine start characteristics to allow starting the engine 24 using electric power from an external charging source (either AC or DC) without the high-voltage battery 42 being connected. If the high-voltage battery 42 is able to be charged, then after the engine 24 has started, the high-voltage battery 42 will be connected while the engine 24 is running and the high-voltage battery 42 will be charged. The vehicle will run in a performance limited mode that maintains a stable HV bus voltage while the high-voltage battery 42 remains unavailable. This solution utilizes existing vehicle hardware. Potential reasons a jumpstart may be required may include, by way of example, a high-voltage battery 42 that is experiencing low SOC, cell failure in the high-voltage battery 42, or presence of a fault in one of the contactors.

Table 1 is provided as a key wherein the numerically labeled blocks and the corresponding functions are set forth as follows, corresponding to the jumpstart control routine 300.

TABLE 1

| BLOCK | BLOCK CONTENTS |
|---|---|
| 302 | Jumpstart needed to start engine |
| 304 | Operator initiates jumpstart |
| 306 | Is powertrain capable of jumpstart? |
| 308 | Send driver message Connect charger OR system fault |
| 310 | Jumpstart message displayed |
| 312 | Energize charger contactor and propulsion contactor |
| 314 | Read HV battery SOC |
| 316 | Does SOC permit start using high-voltage battery in parallel? |
| 318 | Close pre-charge contactor switch |
| 320 | Close main contactor switch |
| 322 | Operate charger in current mode to charge propulsion capacitor; and then Operate in Voltage mode |
| 324 | Reduce APM voltage to minimize power |
| 326 | Adjust engine starting parameters for low-power engine starting |
| 328 | Execute engine starting |
| 330 | Send message to disconnect charger |
| 332 | Is charger disconnected? |
| 334 | Is high-voltage battery connected? |
| 336 | Is high-voltage battery capable of holding a charge? |
| 338 | Run engine so high-voltage level is interpreted as battery high-voltage level |
| 340 | Close pre-charge contactor switch |
| 342 | Close main contactor switch |
| 344 | Charge Battery |
| 346 | Run engine in limited battery power mode |
| 348 | Transition to normal vehicle power mode |
| 350 | Send message to driver; End execution |

The jumpstart control routine (routine) 300 initiates when an operator initiates a vehicle start procedure, e.g., via a vehicle start button of the user interface 14, and the controller determines that the high-voltage electric power system 40 is not capable of starting the engine 24 (302). Such an indication may occur in response to an indication that a state of charge (SOC) of the high-voltage battery 42 is below a minimum threshold, or an indication that a high-voltage interlock circuit is open.

The operator may initiate a jumpstart event (304), which may include the operator inputting a command via the user interface 14 to initiate a jumpstart. Alternatively, the operator may initiate a jumpstart event by plugging the AC charger 62 to the remote AC power source 70 or plugging into the remote DC power source 170.

The routine 300 indicates whether the high-voltage electric power system 40 is capable of executing a jumpstart (306). If not (306)(0), the routine 300 sends a message to the operator via the user interface 14 to connect the charger to the system, or indicates to the operator via the user interface 14 that there is a fault in the high-voltage electric power system 40 that prevents a jumpstart from being executed (308).

When the high-voltage electric power system 40 is capable of executing a jumpstart (306)(1), the routine 300 conveys a message to the operator via the user interface 14 so indicating (310). The routine 300 activates the APM contactor switch 60 and the positive contactor switch 58 arranged in electrical series with the TPIM 32 between HV+ 44 and HV− 46 (312). The routine 300 determines a SOC of the high-voltage battery 42 based upon signal inputs from the voltage sensor 56 and the current sensor 48, employing known methods for determining SOC for a high-voltage battery (314).

The routine 300 evaluates the SOC for the high-voltage battery 42 to determine whether there is sufficient stored electric power to permit the high-voltage battery 42 to assist the engine starting (316).

When there is insufficient stored electric power thus precluding using the high-voltage battery 42 to assist the engine starting (316)(0), the routine 300 charges the propulsion capacitor 34 by employing the AC charger 62 connected to the remote AC power source 70 or employing the remote DC power source 170 in a low current mode to maintain the voltage at a low level for a predetermined period of time. The charger subsequently switches to a voltage mode to provide high current capability (322).

When there is sufficient stored electric power to permit the high-voltage battery 42 to assist the engine starting (316)(1), the routine 300 activates the pre-charge contactor switch 50 (318) and then closes the negative bus contactor switch 52 (320), both of which have been opened during or after a previous vehicle shutdown. This occurs under conditions wherein SOC of the battery 42 is too low to start the engine 24 on its own but high enough that the engine 24 will start with supplemental electric power through the charger.

Following such action, the routine 300 reduces the voltage level of the APM 64 to minimize power drain through the APM 64 (324). The vehicle system may execute other actions to minimize low-voltage electric power drain by accessories during the jumpstarting event. The routine 300 modifies engine starting parameters to accommodate a low power start (326), wherein such starting parameters may include adjusting spark timing, fuel injection mass and timing, minimizing engine speed thresholds for executing spark and fuel, and adjusting other factors.

The routine 300 commands the TPIM 32 to power the electric machine 30 to spin and start the internal combustion engine 24 (328). Upon starting the internal combustion engine 24, the routine 300 conveys a message via the user interface 14 directing the operator to disconnect the charger (330) and monitors the charger 62, or the contactors 68, 66 to verify the disconnection (332). The message continues until the remote AC power source 70 or the remote DC power source 170 is disconnected (332)(0). Upon verifying the disconnection (332)(1), the routine 300 determines whether the high-voltage battery 42 is connected (334). If so (334)(1), the routine 300 transitions to a normal vehicle power mode to operate the vehicle (348), communicates the result to the operator via the user interface 14 and ends execution (350). When the high-voltage battery 42 is disconnected (334)(0), the routine 300 determines whether the high-voltage battery 42 is capable of accepting electrical charging (336). If not, the routine 300 indicates to the controller 12 that the high-voltage battery 42 is not capable of accepting electrical charging (336)(0), and the controller 12 controls operation of the engine 24 in a limited battery power mode (346), communicates the result to the operator via the user interface 14 and ends execution (350). Controlling the operation of the engine 24 in the limited battery power mode may include, by way of non-limiting examples, controlling the engine 24 to generate mechanical power to meet the operator requests for torque generation without supplemental torque power being provided from the electric machine 30, and to meet the accessory electric power demands without electric power being provided from the high-voltage battery 42. When the high-voltage battery 42 is capable of accepting electrical charging (336)(1), the routine 300 closes, i.e., activates the pre-charge contactor switch 50 (340) and then closes the negative bus contactor switch 52 (342), thus permitting charging of the high-voltage battery 42 (344). The routine 300 transitions to the normal vehicle power mode to operate the vehicle (348), communicates the result to the operator via the user interface 14 and ends execution (350).

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied in any tangible medium of expression having computer-usable program code embodied in the medium.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for starting an internal combustion engine of a multi-mode powertrain system including a high-voltage electric machine electrically connected to a high-voltage electric power system, the method comprising:
in response to an operator initiating a jumpstart:
electrically connecting the high-voltage electric power system to a remote electric power source;
energizing contactors between the high-voltage electric power system and the remote electric power source;
minimizing electric power flow through an auxiliary power module electrically connected to the high-voltage electric power system, wherein the auxiliary power module supplies electric power to an accessory device;
modifying engine starting parameters; and
starting the internal combustion engine by controlling, via a controller, the high-voltage electric machine to spin the internal combustion engine, and controlling operation of the internal combustion engine based upon the modified engine starting parameters.

2. The method of claim 1, wherein electrically connecting the high-voltage electric power system to the remote electric power source comprises electrically connecting the high-voltage electric power system to a remote AC electric power source.

3. The method of claim 1, wherein electrically connecting the high-voltage electric power system to the remote electric power source comprises electrically connecting the high-voltage electric power system to a remote DC electric power source.

4. The method of claim 3, wherein electrically connecting the high-voltage electric power system to a remote DC electric power source comprises electrically connecting the high-voltage electric power system to a remote mobile power source supplying the DC electric power.

5. The method of claim 1, further comprising employing electric power from the high-voltage battery to supplement electric power from the remote electric power source to start the engine when a state of charge of the high-voltage battery is greater than a minimum threshold.

6. The method of claim 1, further comprising:
electrically disconnecting the high-voltage electric power system from the remote electric power source; and then
determining whether the high-voltage battery is capable of accepting electrical charging; and
controlling operation of the engine in a limited battery power mode when the high-voltage battery is not capable of accepting electrical charging.

7. The method of claim 6, wherein controlling operation of the engine in the limited battery power mode comprises controlling the engine to generate mechanical power to meet the operator requests for torque generation without supplemental power being provided from the electric machine and to meet accessory electric power demands without electric power being provided from the high-voltage battery.

8. The method of claim 6, further comprising controlling operation of the engine in a normal battery power mode when the high-voltage battery is capable of accepting electrical charging.

9. The method of claim 8, further comprising operating the internal combustion engine to maintain voltage in the high-voltage electric power system at a level of the high-voltage battery and connecting the high-voltage battery to the high-voltage electric power system.

10. The method of claim 1, wherein minimizing electric power flow through the auxiliary power module electrically connected to the high-voltage electric power system comprises minimizing electric voltage of the auxiliary power module.

11. A multi-mode powertrain system, comprising:
an internal combustion engine, a high-voltage electric machine, a high-voltage electric power system, an auxiliary power module and a controller;
the controller including algorithmic code executable in response to electrically connecting the high-voltage electric power system to a remote electric power source and initiating a jumpstart event, the code operative to:
energize contactors between the high-voltage electric power system and the remote electric power source;
minimize electric power flow through the auxiliary power module electrically connected to the high-voltage electric power system, wherein the auxiliary power module supplies electric power to an accessory device;
modify engine starting parameters; and
control the high-voltage electric machine to spin the internal combustion engine, and control operation of the internal combustion engine based upon the modified engine starting parameters to effect engine starting.

12. The multi-mode powertrain system of claim 11, wherein the algorithmic code executable in response to electrically connecting the high-voltage electric power system to the remote electric power source comprises the algorithmic code executable in response to electrically connecting the high-voltage electric power system to a remote AC electric power source.

13. The multi-mode powertrain system of claim 11, wherein the algorithmic code executable in response to electrically connecting the high-voltage electric power system to the remote electric power source comprises algorithmic code executable in response to electrically connecting the high-voltage electric power system to a remote DC electric power source.

14. The multi-mode powertrain system of claim 11, further comprising algorithmic code executable to employ electric power from the high-voltage battery to supplement electric power from the remote electric power source to start the engine when a state of charge of the high-voltage battery is greater than a minimum threshold.

15. The multi-mode powertrain system of claim 11, further comprising:
algorithmic code executable in response to electrically disconnecting the high-voltage electric power system from the remote electric power source, including code operative to:
determine whether the high-voltage battery is capable of accepting electrical charging; and
control operation of the engine in a limited battery power mode when the high-voltage battery is not capable of accepting electrical charging.

16. The multi-mode powertrain system of claim 15, wherein code operative to control operation of the engine in the limited battery power mode comprises code operative to control the engine to generate mechanical power to meet the operator requests for torque generation without supplemental power being provided from the electric machine and to meet accessory electric power demands without electric power being provided from the high-voltage battery.

17. The multi-mode powertrain system of claim 15, further comprising code operative to control operation of the engine in a normal battery power mode when the high-voltage battery is capable of accepting electrical charging.

18. The multi-mode powertrain system of claim 17, further comprising code operative to operate the internal combustion engine to maintain voltage in the high-voltage electric power system at a level of the high-voltage battery and code operative to connect the high-voltage battery to the high-voltage electric power system.

19. The multi-mode powertrain system of claim 11, wherein the code operative to minimize electric power flow through the auxiliary power module electrically connected to the high-voltage electric power system comprises code operative to minimize electric voltage of the auxiliary power module.

\* \* \* \* \*